US012752742B2

(12) United States Patent
Janiszewski et al.

(10) Patent No.: US 12,752,742 B2
(45) Date of Patent: Oct. 6, 2026

(54) RAIN SENSOR PHANTOM WIPE PREVENTION

(71) Applicant: Valeo Schalter und Sensoren GmbH, Bietigheim-Bissingen (DE)

(72) Inventors: Robert Janiszewski, Bietigheim-Bissingen (DE); Sergio Pesina Sifuentes, Bietigheim-Bissingen (DE); Dinesh Sabavath, Bietigheim-Bissingen (DE); Mohammad Alam, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 278 days.

(21) Appl. No.: 18/472,773

(22) Filed: Sep. 22, 2023

(65) Prior Publication Data

US 2025/0100511 A1 Mar. 27, 2025

(51) Int. Cl.
*B60S 1/08* (2006.01)
*G01S 7/48* (2006.01)
*G01S 17/95* (2006.01)

(52) U.S. Cl.
CPC ........... *B60S 1/0833* (2013.01); *G01S 7/4802* (2013.01); *G01S 17/95* (2013.01)

(58) Field of Classification Search
CPC .... B60S 1/0833; B60S 1/0855; B60S 1/0818; B60S 1/0859; G01S 7/4802; G01S 7/41; G01S 13/00; G01S 17/95
See application file for complete search history.

(56) References Cited

U.S. PATENT DOCUMENTS

| | | | | |
|---|---|---|---|---|
| 5,017,847 | A | 5/1991 | Leistenschneider | |
| 6,066,933 | A * | 5/2000 | Ponziana | B60S 1/0885 318/443 |
| 9,322,952 | B2 | 4/2016 | Niemann et al. | |
| 2015/0049326 | A1* | 2/2015 | Lundquist | G01S 7/483 356/5.01 |
| 2018/0170316 | A1* | 6/2018 | Park | G01N 21/45 |
| 2020/0371270 | A1* | 11/2020 | Mirassou | G01V 8/22 |

FOREIGN PATENT DOCUMENTS

| | | | | |
|---|---|---|---|---|
| EP | 3766746 A1 * | 1/2021 | | B60S 1/0859 |

* cited by examiner

*Primary Examiner* — Erin M Piateski
*Assistant Examiner* — John C Merino
(74) *Attorney, Agent, or Firm* — Valeo Schalter und Sensoren GmbH

(57) ABSTRACT

A rain sensor includes an emitter, a receiver, a processor, and a printed circuit board (PCB). The emitter projects an incident beam that is reflected, as a reflected beam, by a windshield of a vehicle that includes the rain sensor. The receiver generates, based upon a received intensity of the reflected beam, a rain signal indicating a potential presence of rainwater on the windshield. The processor receives the rain signal and performs a filtering operation on the rain signal to generate a filtered signal. The PCB electronically interconnects the emitter, the receiver, and the processor. The filtering operation comprises filtering noise from the rain signal such that the filtered signal has a signal frequency within a predetermined range of frequencies and related harmonics with respective magnitudes and frequencies that are correlated with a definitive presence of the rainwater on the windshield.

17 Claims, 6 Drawing Sheets

RAIN SENSOR PHANTOM WIPE PREVENTION

BACKGROUND

In order to remove rainwater or other foreign objects from a windshield of a vehicle, a vehicle is conventionally equipped with windshield wiper blades. The wiper blade includes a rubber, silicone, composite, or equivalent material that contacts the windshield. As the wiper blade is actuated by a wiper motor, the wiper blade wipes the rainwater and other foreign objects, leaving the windshield free of rainwater and other objects and increasing the visibility therethrough. This, in turn, allows an operator to operate the vehicle in a safe manner by maintaining the operator's ability to see the surrounding environment of the vehicle.

Typically, a wiper motor is controlled with a dedicated knob or dial, and has various operating modes. Such operating modes may include, for example, a timed mode where the wiper motor actuates after a specified duration of time, a manual mode, where an operator presses a button or rotates a dial to instruct the motor to actuate, or an automatic mode, where the wiper motor is instructed to actuate according to a rain sensor. In the case of the automatic mode, the rain sensor may operate, for example, by transmitting and receiving an optical signal that is reflected by the windshield to indicate the presence of rainwater thereon.

However, vehicle vibrations and other road conditions can affect the functionality of a rain sensor, as the pressure and temperature changes caused by the driving conditions impact the geometry and elasticity of an adhesive pad that adheres the rain sensor to the windshield. In such cases, the wiper motor may be inadvertently actuated because of these inaccurate readings, despite a lack of rainwater on the windshield. As described herein, a rain sensor may include variants such as a Rain Light Sensor (RLS), Rain Light Solar Sensor (RLSS), Rain Light Humidity Sensor (RLHS), Rain Light Humidity Solar Sensor (RLHSS), or a Rain Light Temperature Sensor (RLTS). Other names or types of sensors, such as a visibility sensor, are also interchangeable with the rain sensor.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A rain sensor includes an emitter, a receiver, a processor, and a printed circuit board (PCB). The emitter projects an incident beam that is reflected, as a reflected beam, by a windshield of a vehicle that includes the rain sensor. The receiver generates, based upon a received intensity of the reflected beam, a rain signal indicating a potential presence of rainwater on the windshield. The processor receives the rain signal and performs a filtering operation on the rain signal to generate a filtered signal. The PCB electronically interconnects the emitter, the receiver, and the processor. The filtering operation comprises filtering noise from the rain signal such that the filtered signal has a signal frequency within a predetermined range of frequencies and related harmonics with respective magnitudes and frequencies that are correlated with a definitive presence of the rainwater on the windshield.

An assembly includes a vehicle, a windshield, a rain sensor, an Electronic Control Unit (ECU), and a wiper motor controller. The vehicle includes a cabin that forms an interior of the vehicle. The windshield provides a barrier between an external environment of the vehicle and the cabin of the vehicle. The rain sensor includes an emitter, a receiver, a processor, and a printed circuit board (PCB). The emitter projects an incident beam that is reflected, as a reflected beam, by a windshield of a vehicle that includes the rain sensor. The receiver generates, based upon a received intensity of the reflected beam, a rain signal indicating a potential presence of rainwater on the windshield. The processor receives the rain signal and performs a filtering operation on the rain signal to generate a filtered signal. The PCB electronically interconnects the emitter, the receiver, and the processor. The filtering operation comprises filtering noise from the rain signal such that the filtered signal has a signal frequency within a predetermined range of frequencies and related harmonics with respective magnitudes and frequencies that are correlated with a definitive presence of the rainwater on the windshield. The ECU receives the filtered signal from the rain sensor, processes the filtered signal, and transmits an operating command that includes a duration and a number of occurrences of a period of time to operate a windshield wiper. The wiper motor controller receives the operating command from the ECU and actuates a wiper motor according to the operating command. The wiper motor is fixed to the wiper of the vehicle such that the wiper actuates according to the operating command received by the wiper motor controller.

A method includes electronically interconnecting an emitter, a receiver, and a processor of a rain sensor. The emitter projects an incident beam that is reflected, as a reflected beam, by a windshield of the vehicle. The reflected beam is received with a receiver, and the receiver generates a rain signal based upon a received intensity of the reflected beam that indicates a potential presence of rainwater on the windshield. The rain signal is transmitted from the receiver to the processor. Subsequently, the processor performs a filtering operation on the rain signal to generate a filtered signal such that the filtered signal has a signal frequency within a predetermined range of frequencies and related harmonics with respective magnitudes and frequencies that are correlated with a definitive presence of the rainwater on the windshield.

Any combinations of the various embodiments and implementations disclosed herein can be used in a further embodiment, consistent with the disclosure. Other aspects and advantages of the claimed subject matter will be apparent from the following description and the claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms “upper” and “lower” may be used to describe the position of an element in a vehicle as described herein. In this respect, the term “upper” denotes an element disposed vertically above a corresponding “lower” element relative to a vehicle as a whole, while the term “lower” conversely describes an element disposed vertically below a corresponding “upper” element.

In general, embodiments of the invention are directed towards a rain sensor that is rigidly fixed to a windshield of a vehicle with an adhesive pad. The rain sensor is equipped with a processor that utilizes a filter to discard frequencies of the signal of the rain sensor that do not correspond to a presence of rainwater on the windshield of the vehicle. As a consequence of the filtering operation, the wiper motor is controlled according to a filtered signal from the rain sensor that is correlated with the presence of rainwater on the windshield, regardless of the shape, geometry, and other physical properties of the adhesive pad. This, in turn, prevents the wiper motor from being actuated when the windshield is free of rainwater and the rain sensor receives a false or errant rain signal.

Figure 1:
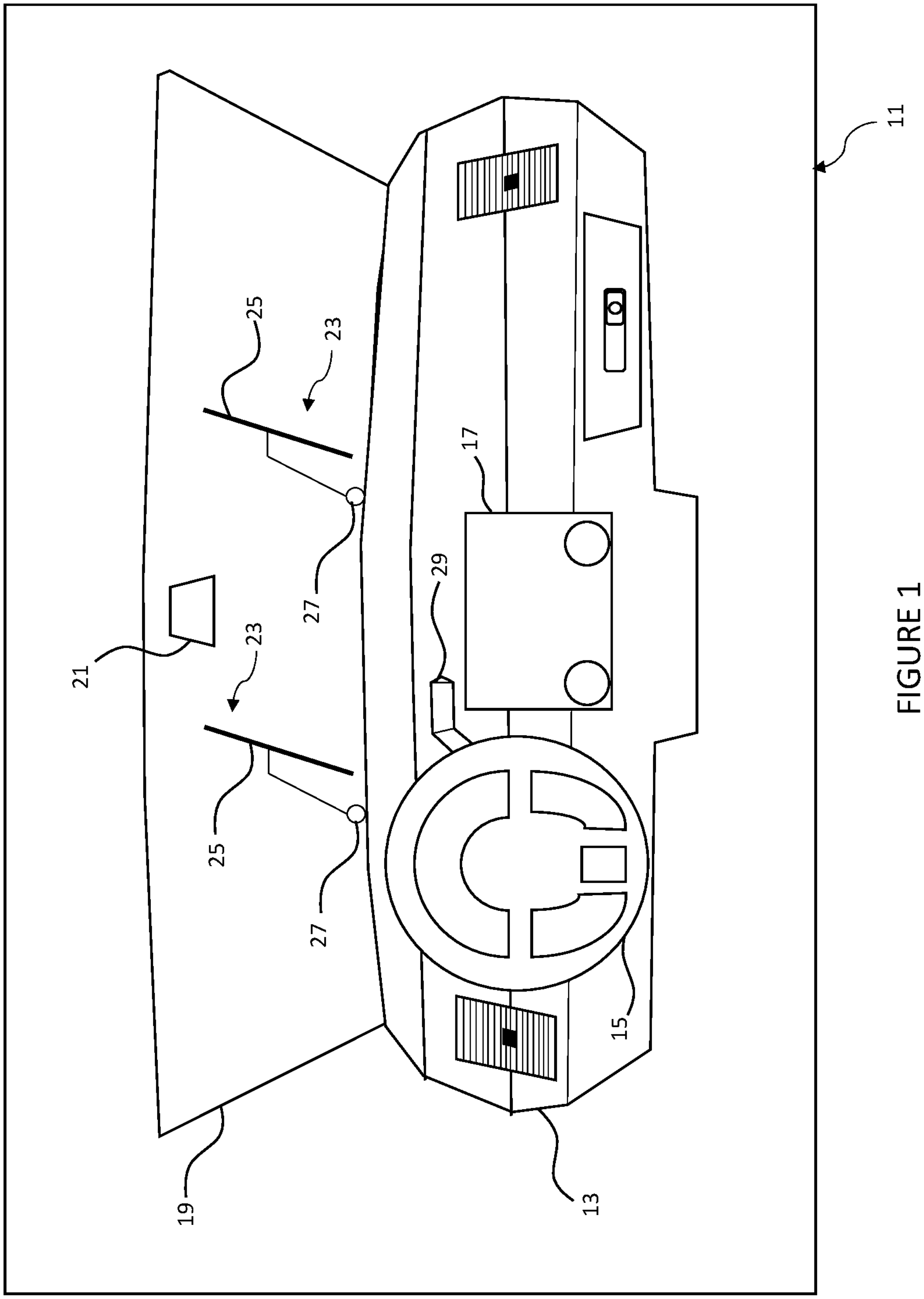
FIG. 1 depicts an overview of a vehicle cabin in accordance with one or more embodiments of the present disclosure.
Figure 5:
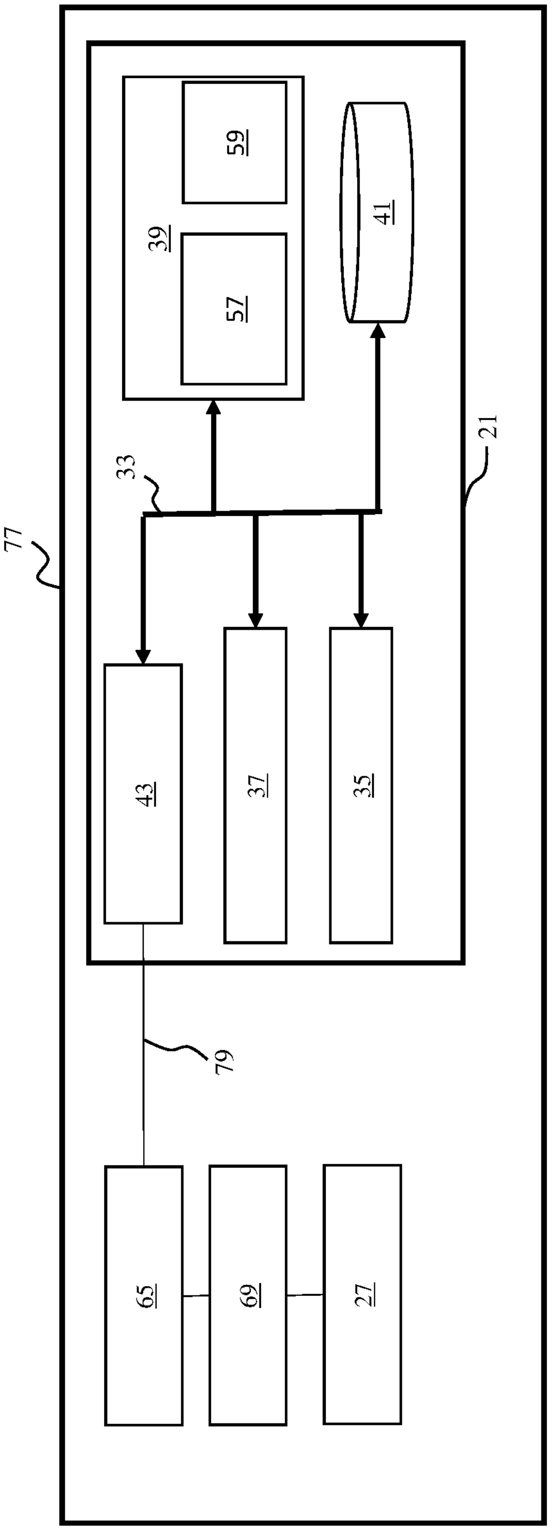
FIG. 5 depicts a block diagram of an assembly including a vehicle in accordance with one or more embodiments of the present disclosure.

FIG. 1 depicts an overview of a cabin 11 forming the interior of a motor vehicle (e.g., FIG. 5). The cabin 11 includes components used to operate the motor vehicle and to protect an operator of the motor vehicle. For example, to protect the occupants of the vehicle, the cabin 11 is equipped with a dashboard 13 that houses an airbag (not shown) to protect the occupant of the vehicle in the event of a collision, and a windshield 19 that prevents rainwater from entering the cabin 11. To control the vehicle, the cabin 11 includes components such as a steering wheel 15 that controls the direction of travel of the vehicle, and a center console 17 that is used to select and display convenience features to the operator.

As depicted in FIG. 1, the vehicle (e.g., FIG. 5) is further equipped with components to ensure that the windshield 19 is clear of foreign objects. As described herein, a windshield 19 may be covered with foreign objects including, for example, rainwater, dust, or dirt, but may also include any other object(s) that detrimentally impact the clarity of the windshield 19 and/or an operator's perception of a surrounding environment of the vehicle. Thus, the windshield 19 provides a barrier between an external environment of the vehicle and the cabin 11 of the vehicle to prevent foreign objects from entering the vehicle. To detect the rainwater, a rain sensor 21 is attached to an upper portion of the windshield 19. The structure and functionality of the rain sensor 21 is further described in relation to FIG. 2, and is briefly discussed below. As noted above, examples of a rain sensor 21 as described herein include, but are not limited to, a Rain Light Sensor (RLS), Rain Light Solar Sensor (RLSS), Rain Light Humidity Sensor (RLHS), Rain Light Humidity Solar Sensor (RLHSS), a Rain Light Temperature Sensor (RLTS), or equivalent sensory devices.

When the rain sensor 21 detects the presence of rainwater on the windshield 19, the rain sensor 21 transmits a signal to an Electronic Control Unit (ECU) (e.g., FIG. 3) that controls a series of wipers 23 according to the potential presence of rainwater (or lack thereof) on the windshield 19. To this end, the wipers 23 each include a wiper blade 25 and a wiper motor 27. The wiper motor 27 is connected to a wiper motor controller (e.g., FIG. 3) that receives an operating command from the ECU, and actuates according to the operating command.

A wiper motor 27 may be operated according to a plurality of modes as described above, and the operating commands further correspond to the selected operating mode. Specifically, an operator may select the operating mode through the use of a mode selection knob 29 that is connected to the steering wheel 15 and transmits instructions to the ECU (e.g., FIG. 5). Alternatively, the operating mode may be selected using the center console 17, for example. As discussed above, the wiper motor 27 may be operated in an automated manner, where the actuation of the wiper motor 27 is determined by the rain sensor 21. In this case, the rain sensor 21 detects the presence of rainwater (or lack thereof) on the windshield 19, and transmits operating commands to the ECU (e.g., FIG. 3) that correspond to the level of rainwater on the windshield. Thus, the operating commands include, for example, a duration, a speed, a frequency, and a number of occurrences of a period of time to operate the wiper motor 27. Because the wiper motor 27 is fixed to a wiper blade 25, the wiper blade 25 actuates with the motion of the wiper motor 27. Thus, the overall operation of the wiper blade 25, and the corresponding process of removing rainwater from the windshield 19, is controlled according to operating commands provided by the rain sensor 21 when the wiper motor 27 is operated automatically.

Figure 2:
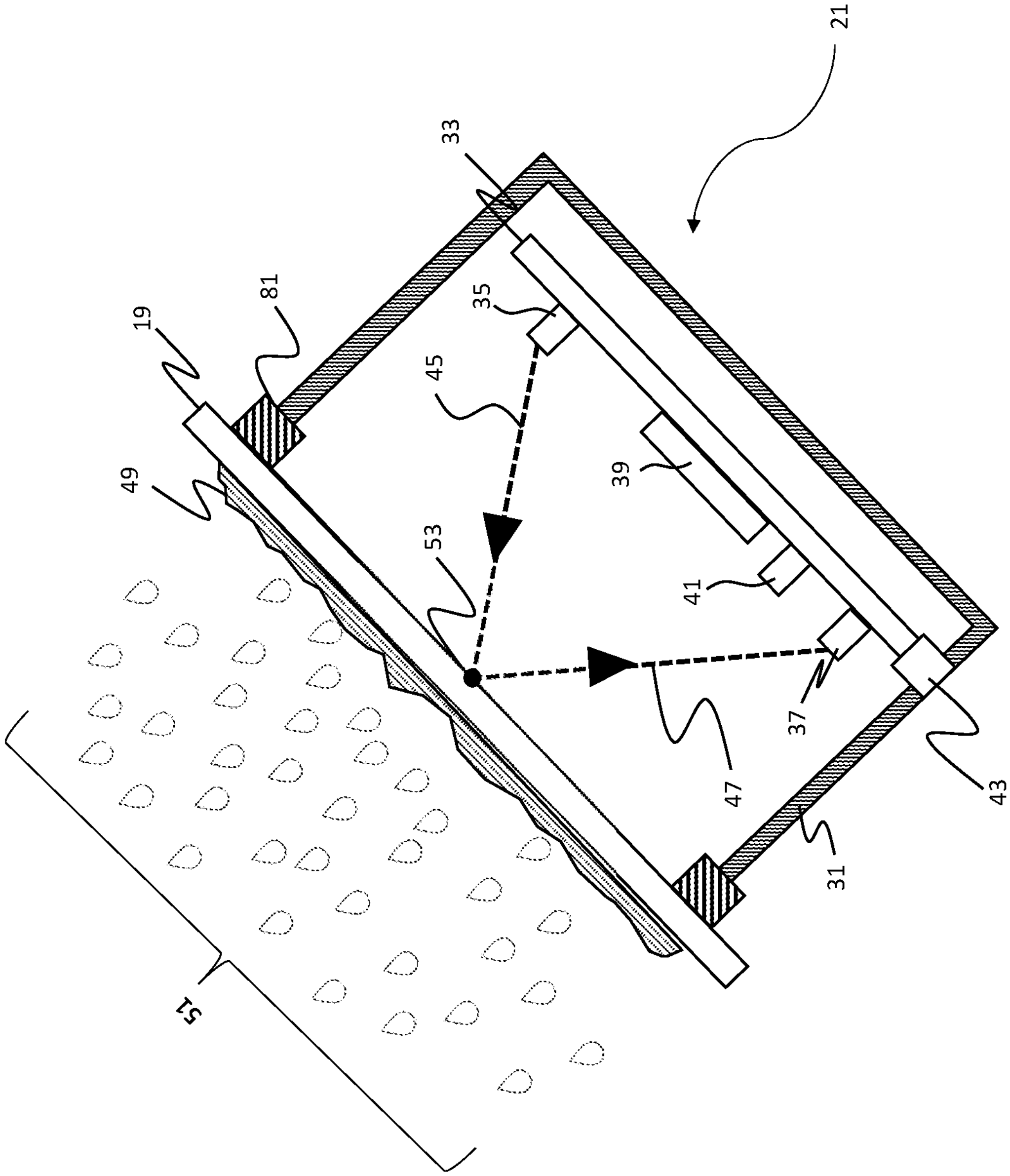
FIG. 2 depicts a sensor in accordance with one or more embodiments of the present disclosure.

Turning to FIG. 2, FIG. 2 depicts a windshield 19 and a rain sensor 21 in accordance with one or more embodiments of this disclosure. As shown in FIG. 2, the rain sensor 21 includes a casing 31 that forms the exterior structure of the rain sensor 21. The casing 31 serves as a protective shell and mounting surface for components of the rain sensor 21, and further provides a surface to mount the rain sensor 21 to the windshield 19.

Inside of the casing 31, the rain sensor 21 includes a circuit board 33, an emitter 35, a receiver 37, a processor 39, a memory 41, and a connector 43, which form the primary electrical components of the rain sensor 21. Components of the rain sensor 21 are powered by way of the connector 43, which is a port that allows electrical signals to be transmitted between the rain sensor 21 and the ECU (e.g., FIG. 3). Accordingly, power is transmitted to the rain sensor 21 by way of the connector 43, and is redistributed to the other components by way of the circuit board 33. Thus, the circuit board 33 includes a conductive layer (not shown) that electrically interconnects the various components of the rain sensor 21. By way of the circuit board 33, power is transferred to the emitter 35 according to instructions from the processor 39, which allows the emitter 35 to generate an incident beam 45 that is used to determine the potential presence of rainwater on the windshield 19.

Specifically, while the vehicle (e.g., FIG. 5) is being operated, the emitter 35 generates and transmits an incident beam 45 in the direction of the windshield 19 according to instructions (i.e., a duration, intensity, and frequency) transmitted by the processor 39. The incident beam 45 is an optical signal such as a laser beam, infrared light, or equivalent ray transmitted by the emitter 35. Thus, the emitter 35 is embodied, for example, as a laser pointer that emits visible or Infrared (IR) wavelengths, diode, Light Emitting Diode (LED), projector, or other signal generation device capable of emitting a beam-shaped optical signal. Depending upon the presence of rainwater 49 on the windshield 19, the intensity of the incident beam 45 reflected by the windshield 19 varies.

During normal operation, the incident beam 45 is reflected at a reflection point 53 as a reflected beam 47. The reflected beam 47 has a direction of travel such that the reflected beam 47 is reflected at a high intensity (i.e., entirely reflected or substantially reflected) at the reflection point 53 by the windshield 19 to the receiver 37. However, and as depicted in FIG. 2, during rainy weather conditions, a plurality of rain drops 51 will strike the windshield 19, where the plurality of rain drops 51 collect to form a layer of rainwater 49 on the windshield 19. Accordingly, when rainwater 49 is present on the windshield 19, the refractive index of the windshield 19 changes and the reflected beam 47 is only partially reflected, or is not reflected at all, with a relatively low intensity.

To receive the reflected beam 47 and determine the intensity thereof, the receiver 37 is formed with a photocell sensor, for example. As is commonly known in the art, photocells comprise semiconductors (photodiodes) that react to a particular wavelength of radiation, such as Infrared (IR) light, and generate electrical signals with a magnitude corresponding to the intensity of IR radiation. Thus, the receiver 37 is capable of recording not only the presence of a reflected beam 47, but also the intensity thereof according to the excitation of its semiconductors. A high level of excitation of the receiver 37 corresponds to a high intensity of the reflected beam 47, while a low level of excitation of the receiver 37 corresponds to a low reflected intensity of the beam 47.

The emitter 35 and the receiver 37 are configured to transmit and receive multiple beams of high intensity IR radiation over a short period of time. Rapidly varying angles of the reflection and refraction of the emitted beams, which are caused by the rainwater 49 on the windshield 19 and by the vehicle vibrations, cause variations in the intensity of the received IR radiation signal, and the variations are captured by the receiver 37. In addition, the intensity of the received IR radiation may also depend on the dispersion of an emitted beam, which is caused by the beam refraction and absorption by the medium, (i.e., by the windshield 19) and by the presence of rainwater 49 on the windshield 19.

After a reflected beam 47 is received by the receiver 37, the receiver 37 transmits a rain signal, indicating the potential presence of rainwater 49 on the windshield 19, to the processor 39. The location of the emitter 35, the receiver 37, and the reflection point 53 are selected such that an incident beam 45 emitted by the emitter 35 strikes the reflection point 53 of the windshield 19 and is reflected, as a reflected beam 47, directly to the receiver 37 with a high intensity when the windshield 19 is free of rainwater 49.

The received intensity of the reflected beam 47 captured by the receiver 37 is transmitted as a rain signal to the processor 39, which interprets the beam intensity of the reflected beam 47 and the corresponding level of rainwater 49. During periods where the reflected beam 47 is reflected with a high intensity (i.e., little to no rainwater 49), the processor 39 transmits operating commands to the ECU (via the connector 43) to not activate or slowly actuate the wipers 23. On the other hand, during periods of medium intensity (i.e., minimal to moderate levels of rainwater 49), the processor 39 directs the wipers 23 to operate with a period of rest between passes over the windshield 19. Finally, if the windshield 19 is heavily covered with rainwater 49, the reflected beam 47 is received with little to no intensity and the processor 39 directs the wipers 23 to actuate continuously or near-continuously.

However, the above mentioned process is necessarily dependent upon the geometry and position of the reflection point 53 of the windshield 19 in relation to the emitter 35 and the receiver 37. Thus, as the vehicle (e.g., FIG. 5) traverses a paved surface, protrusions or crevices in the paved surface can cause vibrations to translate throughout the vehicle that affect the position of the windshield 19, the reflection point 53, and the rain sensor 21. For example, the vehicle may traverse a protrusion in the road during a period of time after the incident beam 45 is transmitted from the emitter 35 but before the incident beam 45 strikes the reflection point 53 of the windshield 19. In such a case, the windshield 19 will move vertically with the vehicle, while the incident beam 45 remains on its original path. This shift in the position of the windshield 19 causes the reflection point 53 to shift as well, and the incident beam 45 will strike the windshield 19 adjacent to the reflection point 53, rather than striking the reflection point 53 itself. In this way, the receiver 37 will receive only a portion of the reflected beam 47, or none of the reflected beam 47, despite no rainwater 49 being present on the windshield 19. This causes the processor 39, which interprets the intensity of the reflected beam 47 from the receiver 37, to incorrectly determine that the windshield 19 is covered by rainwater 49

To mitigate the above incorrect determination of rainwater 49 being present on the windshield 19, the processor 39 transforms a rain signal received from the receiver 37 to the frequency domain, and performs a filtering operation. The rain signal itself is a function of the intensity of the reflected beam 47, where multiple intensity readings spanning a predetermined period of time are coalesced into a single rain signal. The rain signal is transformed from the time domain to the frequency domain by way of a Fourier Transform process. Examples of Fourier Transforms that may be used by the processor 39 include a Fast Fourier Transform (FFT) process such as a Cooley-Tukey algorithm, a Prime Factor algorithm, a Fourier Integral, or similar continuous, discrete, periodic, and aperiodic processes for transforming the signal from the time domain to the frequency domain. Once the time domain component of the rain signal has been transformed to the frequency domain, the processed rain signal is filtered by the processor 39 as part of the filtering operation.

The processed rain signal is subsequently passed through a filter as part of the filtering operation. The filter utilized by the filtering operation includes, for example, a Butterworth filter, an elliptic filter, a comb filter, a notch filter, a low pass filter, a high pass filter, a band pass filter, or an equivalent filter applied to the transformed rain signal. The filter applied by the filtering operation has a range that excludes frequencies associated with the presence of noise, while still including the range of frequencies correlated with the presence of rainwater 49 on a windshield 19 of the vehicle. For convenience, the processor 39 may store the rain signal, the Fourier transform process, outputs of the filtering operation, and the filter utilized by the filtering operation on the memory 41, and access the memory 41 to analyze the rain signal.

As noted above, the vibrations decrease the received intensity of the reflected beam 47 by causing the incident beam 45 to be reflected at a location adjacent to the reflection point 53. In the case of a windshield 19 free of rainwater 49, the reflected beam 47 will normally impact the receiver 37 unless a vibration causes the reflection point 53 to shift. Thus, as discussed above, the reflected beam 47 is normally received at a high frequency. On the other hand, because vehicle vibrations occur much less frequently than a reflected beam 47 is received, a receiver 37 will receive errant readings at a relatively low frequency compared to that of the accurate readings. For example, in a case where the windshield 19 is free of rainwater 49, and the vehicle (e.g., FIG. 5) is traveling on a rough surface, then a rain signal with a high intensity will be received from the receiver 37 frequently, and the processor 39 will discard signals with a low frequency and/or intensity. Thus, to discard errant values during the filtering operation, a high pass filter may be used that discards values below the frequency of the high intensity reflected beam 47, which prevents the processor 39 from controlling the wipers 23 according to the errant values of the rain signal.

On the other hand, cases may exist where the operator wishes to discard values above the frequency of the reflected beam 47 as well. For example, if the windshield 19 is covered by rainwater 49 and is experiencing vibrations at the same time, the intensity and frequency of the reflected beam 47 may fluctuate between low and high values depending on the reflection angle of the reflected beam 47. In this case, a processor 39 may wish to discard values that have a high frequency outside of the range of frequencies normally associated with the presence of rainwater 49 on the windshield 19. Thus, the type of filter and/or frequency ranges used by the processor 39 may vary according to the contemplated road conditions experienced by the vehicle.

Acceptable filtering ranges may be determined according to a manufacturer's specification, or manually input by an operator of the vehicle. Furthermore, frequency ranges may be adjusted by the operator, using the mode selection knob 29 or the center console 17 for example, while the vehicle (e.g., FIG. 5) is being operated. A processor 39 may be further equipped with multiple acceptable frequency ranges, and switch between the frequency ranges based upon the road conditions of the vehicle. For example, the processor 39 may select a first filtering operation corresponding to a windshield 19 free of rainwater 49, and change the filtering operation once the processor 39 determines the presence of rainwater 49. In such cases, the processor 39 may operate in a "learning mode" where the processor 39 measures the response of the receiver 37, and selects a filter based upon the most occurring frequencies of the reflected beam 47. Alternatively, if the processor 39 only receives a small number of readings (i.e., a number of readings below a predetermined threshold) from the receiver 37, the processor 39 may conclude that it is filtering out too many values, and select a different range of frequencies or filter in order to capture the previously-discarded frequencies.

Figure 3:
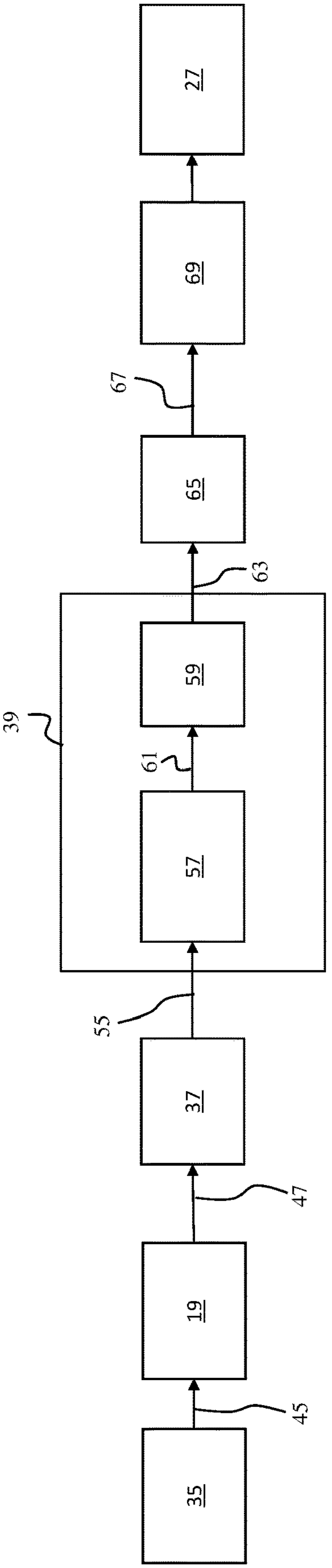
FIG. 3 depicts a flowchart of a process for transmitting signals in accordance with one or more embodiments of the present disclosure.

Once the rain signal has been processed and filtered, the processor 39 outputs the filtered rain signal to the ECU (e.g., FIG. 3). The ECU proceeds to interpret the filtered rain signal to generate an operating command for a wiper motor controller (e.g., FIG. 3) to control the wiper motor 27. The operating command may include, for example, a duration, rotation speed, frequency, and other operating parameters used to control the operation of the wiper motor 27. Alternatively, the processor 39 may determine an operating command by itself, and pass the operating command through the ECU to the wiper motor controller (e.g., FIG. 3). Regardless of its point of origin, the wiper motor controller receives the operating command and controls the wiper motor 27 on the basis thereof. Accordingly, the wiper motor 27 is controlled, overall, as a function of a filtered rain signal formed by the processor 39 rather than as a function of the rain signal itself.

Alternatively, noise (such as vibrations of the vehicle, temperature variations of the vehicle, or vibrations and/or temperature variations of components thereof) may be attenuated by an adhesive pad 81 that rigidly fixes the casing 31 of the rain sensor 21 to the windshield 19. As depicted in FIG. 2, the adhesive pad 81 extends around the upper periphery of the casing 31 of the rain sensor 21. Thus, vehicle vibrations are transmitted through the windshield 19, the adhesive pad 81, and the casing 31 before affecting the position of the emitter 35. To attenuate the noise, the adhesive pad 81 may be formed, for example, of polyurethane, silicone, one or more epoxies, derivatives or combinations of these materials, or an equivalent material known to a person of ordinary skill in the art. In this way, noise generated by the vehicle (e.g., FIG. 5) may be lessened by the adhesive pad 81, which reduces or removes the filtering operation performed by the processor 39.

However, changes in the geometry of the adhesive pad 81 may also generate noise in the vehicle. For example, if the adhesive pad 81 is peeling from the windshield 19, then the motion of the vehicle (e.g., FIG. 5) may cause the adhesive pad 81 and casing 31 to vibrate, causing the circuit board 33 to experience vibration as well. Similarly, the adhesive pad 81 may become embrittled due to solar radiation, which detrimentally impacts the ability of the adhesive pad 81 to attenuate frequencies generated by the windshield 19 and the vehicle. Moreover, noise may generate from the adhesive pad 81 in response to acoustic vibrations within the cabin 11 of the vehicle, especially if the vehicle is equipped with a subwoofer or similar speaker packages that generate high and/or low frequencies that the windshield 19 may not attenuate. Based on the combination of the above factors, noise may be generated by changes in the geometry, temperature, and/or physical properties of the adhesive pad 81, and, thus, the filtering operation includes attenuating any noise generated by the adhesive pad 81 as well.

Turning to FIG. 3, FIG. 3 depicts a block diagram of a signal transmission process according to one or more embodiments of the present disclosure. The signal originates in the emitter 35 as an incident beam 45, which is generated at a particular frequency. Once the incident beam 45 is transmitted from the emitter 35, the incident beam 45 impacts the reflection point 53 on the windshield 19, and is reflected back from the emitter 35 as a reflected beam 47. The reflected beam 47 is returned to a receiver 37, which is a photocell sensor that captures the intensity and duration of the reflected beam 47. Once the receiver 37 receives the reflected beam 47, the receiver 37 generates a rain signal 55 representing the parameters (i.e., duration, intensity) of the reflected beam 47.

From the receiver 37, the rain signal 55 is transmitted to the processor 39. As noted above, the receiver 37 and the processor 39 are connected by way of a physical connecting layer formed by the circuit board 33. As depicted in FIG. 3, the processor 39 includes a Digital Signal Processing (DSP) unit 57 and a filter unit 59. The DSP unit 57 receives the rain signal 55 from the receiver 37, and performs processing in the time domain or frequency domain of the rain signal 55 to create a processed rain signal 61. As discussed above, a Fourier Transform used to process a rain signal in a frequency domain or a convolution used to process a rain signal in a time domain may be embodied, for example, as processing the rain signal 55 through a Cooley-Tukey algorithm, a Prime Factor algorithm, a Fourier Integral, or similar continuous, discrete, periodic, and aperiodic processes for transforming the signal from the time domain to the frequency domain, or vice versa, to perform further processing thereon. In this way, the processed rain signal 61 is a signal with a frequency, magnitude, and phase representing the potential presence for rainwater 49 on the windshield 19.

Once the processed rain signal 61 has been generated by the DSP unit 57, the filter unit 59 performs a filtering operation on the processed rain signal 61 to generate a filtered signal 63. As noted above, the filtering operation includes applying a filter to the processed rain signal 61, where the filter may be a Butterworth filter, an elliptic filter, a comb filter, a notch filter, a low pass filter, a high pass filter, a band pass filter, or an equivalent filter for removing unwanted frequencies and related harmonics from the processed rain signal 61. Frequencies and harmonics filtered during the filtering operation include frequencies outside of a predetermined range of frequencies, where the predetermined range of frequencies is determined by a manufacturer of the rain sensor 21 and/or the vehicle (e.g., FIG. 5). The predetermined range of frequencies includes related harmonics with respective magnitudes and phases that correspond to the definitive presence of rainwater 49 on a windshield 19 such that after the processed rain signal 61 is passed through the filter unit 59, the filtered signal 63 includes signals in the predetermined range of frequencies and attenuated frequencies outside of the predetermined range.

The filtered signal 63 is transmitted from the processor 39 to an Electronic Control Unit (ECU) 65 by way of a connector 43 disposed on the circuit board 33. Based upon the frequencies in the predetermined range that are included in the filtered signal 63, the ECU 65 proceeds to generate an operating command 67 for operating a wiper motor 27 and transmit the operating command 67 to a wiper motor controller 69. The operating command 67 includes operating parameters such as a duration, frequency, rotation speed, intensity, or equivalent metrics that the wiper motor 27 is controlled thereby. Upon receiving the operating command 67, the wiper motor controller 69 supplies power to the wiper motor 27 according to the operating parameters. Accordingly, the wiper motor controller 69 may be embodied, for example, as a processor, microprocessor, microcontroller, or equivalent processing device that receives and interprets the operating command 67. Although not depicted, the wiper motor controller 69 may further include power supply components, such as a Variable Frequency Drive (VFD) or voltage regulator, that controls the power supplied to the wiper motor 27. Once the wiper motor 27 receives power from the wiper motor controller 69, the wiper motor 27 actuates, causing the wipers 23 to actuate as well.

Figure 4:
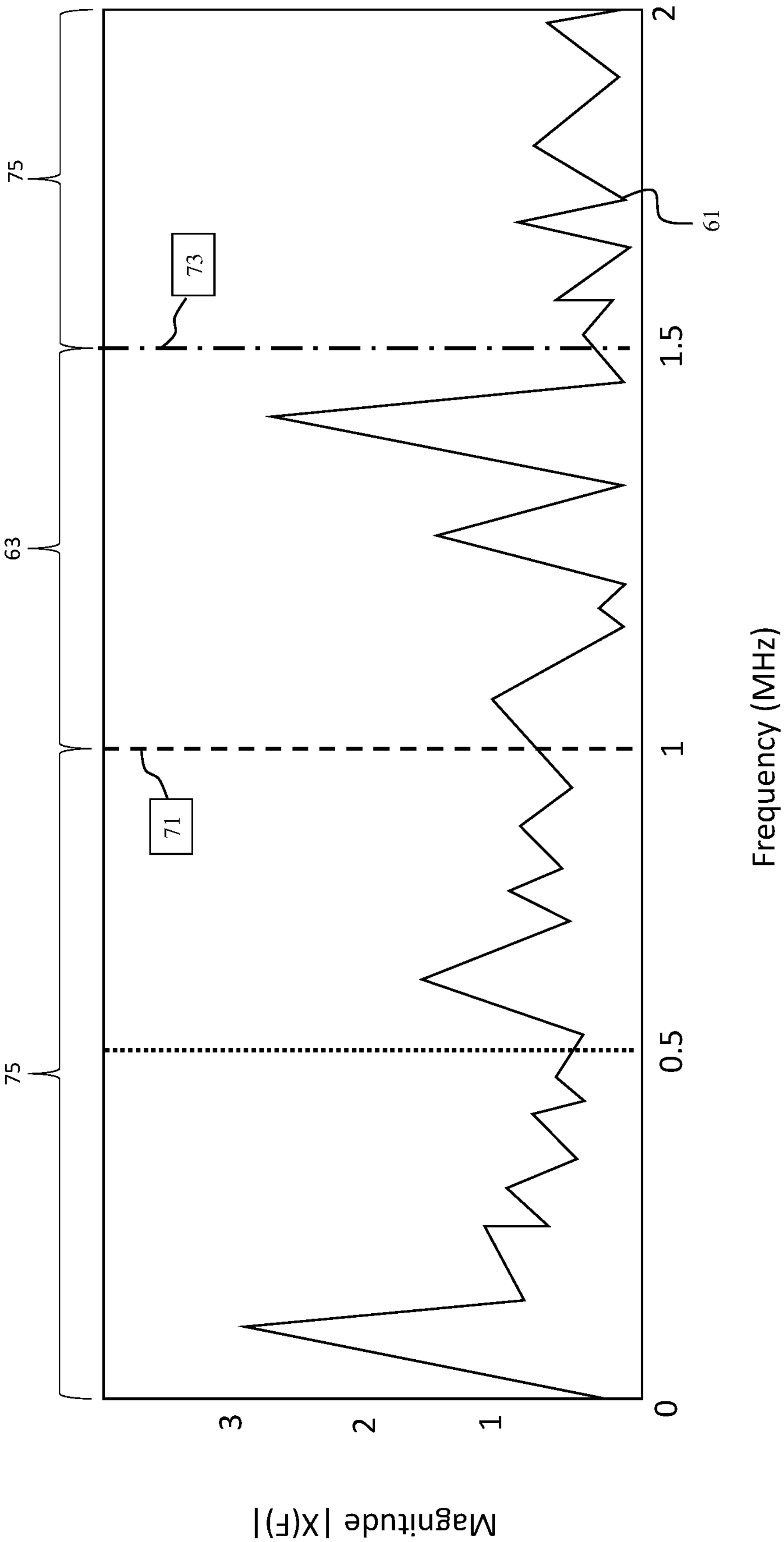
FIG. 4 depicts a graph of a frequency response of a sensor in accordance with one or more embodiments of the present disclosure.

FIG. 4 depicts a frequency-magnitude graph of a Fourier transform of a processed rain signal 61 in accordance with one or more embodiments of this disclosure. As depicted in FIG. 4, the Fourier transform of a processed rain signal 61 has frequencies and related harmonics in the megahertz (MHz) spectrum, occupying, for example, a range of frequencies from 0-2 MHz. Various peaks and valleys of the processed rain signal 61 in the frequency domain are created by variations in the received intensity of the reflected beam 47 by the receiver 37. For example, a high magnitude corresponds to a case where the reflected beam 47 is entirely or almost entirely reflected to the receiver 37, while a low magnitude (proportional to the amplitude thereof) corresponds to a case where the reflected beam 47 is only partially reflected to the receiver 37, or is infrequently reflected to the receiver 37.

FIG. 4 also depicts a visual representation of the filtering operation. As depicted in FIG. 4, a filtering operation includes a high pass filter 71 and a low pass filter 73. As is commonly known in the art, a high pass filter 71 attenuates signals below a cutoff frequency, and the low pass filter 73 attenuates signals above a cutoff frequency. Thus, the predetermined range of acceptable frequencies output by the filter unit 59 includes frequencies above the high pass filter 71 and below the low pass filter 73, which is denoted as the filtered signal 63 in FIG. 4. On the other hand, the ranges of frequencies filtered by the filter unit 59 with the filtering operation are denoted as discarded signal 75 in FIG. 4.

For example, FIG. 4 depicts the high pass filter 71 as being located at a frequency of 1 MHz, while the low pass filter 73 is disposed at a frequency of 1.5 MHz. As such, the filtered signal 63 occupies the frequency range of 1-1.5 MHz, while the discarded signal 75 resides in the frequency range of 0-1 MHz and above 1.5 MHz. In this way, the filtering operation performed by the filter unit 59 removes portions of the processed rain signal 61 that correspond to vibrations of the vehicle, as signals corresponding to the vehicle vibration are attenuated by the high pass filter 71 and the low pass filter 73.

FIG. 5 depicts a block diagram of an assembly including a vehicle 77 in accordance with one or more embodiments of this disclosure. As depicted in FIG. 5, a vehicle 77 includes a rain sensor 21, a bus 79, an ECU 65, a wiper motor controller 69, and a wiper motor 27. The vehicle 77 may be embodied, for example, as a passenger vehicle, commercial vehicle, a gasoline vehicle, a hybrid vehicle, an electric vehicle, or an equivalent vehicle known to a person of ordinary skill in the art.

The rain sensor 21 includes a plurality of components used to generate and receive a signal corresponding to the potential presence of rainwater 49 on the vehicle 77. Specifically, the signal is initially formed by an emitter 35, which is a Light Emitting Diode (LED), laser transmission device, or projector capable of creating a beam of light. The emitter 35 generates a beam as the incident beam 45, which is transmitted in the general direction of a windshield 19. The windshield 19 reflects the incident beam 45 as a reflected beam 47, and the intensity of the reflected beam 47 is captured by the receiver 37. Thus, as described above, the receiver 37 may be embodied as a photocell sensor, for example, such that the receiver 37 is capable of determining the intensity of the reflected beam 47 based upon the excitation level response of the receiver 37.

Once the receiver 37 captures the intensity of the reflected beam 47, the reflected beam 47 is processed by the receiver 37 and transmitted as a rain signal 55 to the processor 39. As depicted in FIG. 5, the receiver 37 and the processor 39 are interconnected by a circuit board 33 of the rain sensor 21. The circuit board 33 may be embodied as a Printed Circuit Board (PCB), a bus, or equivalent circuit that forms electrical pathways for signal transmission between components of the rain sensor 21. Similarly, the processor 39 may be embodied as a dedicated processing circuit, a microprocessor, or equivalent device.

The processor 39 includes a DSP unit 57 and a filter unit 59, where the DSP unit 57 receives the rain signal 55 from the receiver 37 via the circuit board 33. The DSP unit 57 is configured to perform a convolution operation (i.e., an operation of the form y(t)=h(t)*x(t)) on the rain signal 55 (i.e., x(t)) based on a transfer function (i.e., h(t)) representing the structure of the DSP unit 57. The convolution operation converts the rain signal 55 (x(t)) (in the time domain) to the processed rain signal 61 (y(t)) based on the transfer function (h(t)) (the circuit of the DSP unit). The processed rain signal 61 is subsequently channeled to the filter unit 59 as a processed rain signal 61, where the filter unit 59 performs a filtering operation to generate a filtered signal 63. This involves similar mathematical/system operations as described above for the DSP signal processing convolution, where the filter can be represented as a transfer function, $h_F(t)$, and a filtered signal, 63, can be represented as $v_F(t)$ so that the filter convolution is of the form, $v_F(t)=h_F(t)*y(t)$. Analogous logic, similar to that described above for the DSP signal processing operations, can be applied to the various filtering operations described below.

To store the algorithms and processes used in the filtering operation, as well as the signals used before, during, and after the filtering operation, the processor 39 is further coupled to a memory 41. The memory 41 may be embodied, for example, as a non-transitory storage medium such as flash memory, Random Access Memory (RAM), a Hard Disk Drive (HDD), a solid state drive (SSD), a combination thereof, or equivalent. In addition to storing the algorithms and processes for the filtering operation, the processor 39 may also store the rain signal 55, the DSP unit 57, the filter unit 59, any operations performed by the DSP unit 57 and the filter unit 59, the processed rain signal 61, and/or the filtered signal 63 in the memory 41 to be accessed for future use. Furthermore, the memory 41 may be used to store a predetermined range of frequencies corresponding to the definitive presence of rainwater 49 on a windshield 19, or other values and ranges used during the filtering and processing operations. Thus, overall, the memory 41 stores data and signals described herein, and is used by the processor 39 for such data storing purposes.

Subsequent to generating the filtered signal 63 with the processor 39, the filtered signal 63 is output by the processor 39 to the ECU 65 by way of a bus 79. As described herein, the bus 79 is a series of wires, optical fibers, printed circuits, or equivalent structures for transmitting signals between computing devices. Furthermore, although described above as a physical connection, the bus 79 may alternatively be embodied as a virtual network connection between computing devices, such as Wi-Fi, Bluetooth, Zigbee (trademarked), Long-Term Evolution (LTE), $5^{th}$ Generation (5G), or other equivalent forms of network communication. For example, the other forms of network communication may include a LIN bus and/or CAN bus, in which case a rain sensor communicates with a Body Control Module (BCM) through the LIN bus, and the BCM issues a command to the wiper motor controller 69 through the CAN bus to turn on the wipers based upon the relative safety of the wiping, a priority of events, etc. Thus, the bus 79 forms one or more transmitter(s) and receiver(s) between the various components described herein. As shown in FIG. 5, the bus 79 connects to the processor 39 by way of a connector 43, which may be embodied as a ribbon connector or series of terminals, for example. The connector 43 and bus 79 collectively enable the processor 39 to transmit the filtered signal 63 to the ECU 65 by forming a data connection between the processor 39 and the ECU 65.

Once the ECU 65 receives the filtered signal 63, the ECU 65 generates an operating command 67 for the wiper motor controller 69. The ECU 65 may be embodied as a control unit for the entire vehicle 77, or embodied as a localized control unit for the wiper motor controller 69. The operating command 67 is, for example, a command indicating a duration, amount, and number of occurrences of a period of time to operate a wiper motor 27. On the basis of the operating command, the wiper motor controller 69 controls the wiper motor 27, causing the wiper motor 27 to actuate the wipers 23 and clear the windshield 19 of rainwater 49. Thus, the wiper motor 27 is ultimately controlled on the basis of a filtered signal 63 generated in the processor 39, where the filtered signal 63 correlates to the definitive presence of rainwater 49 on the windshield 19 as a result of a filtering operation.

Figure 6:
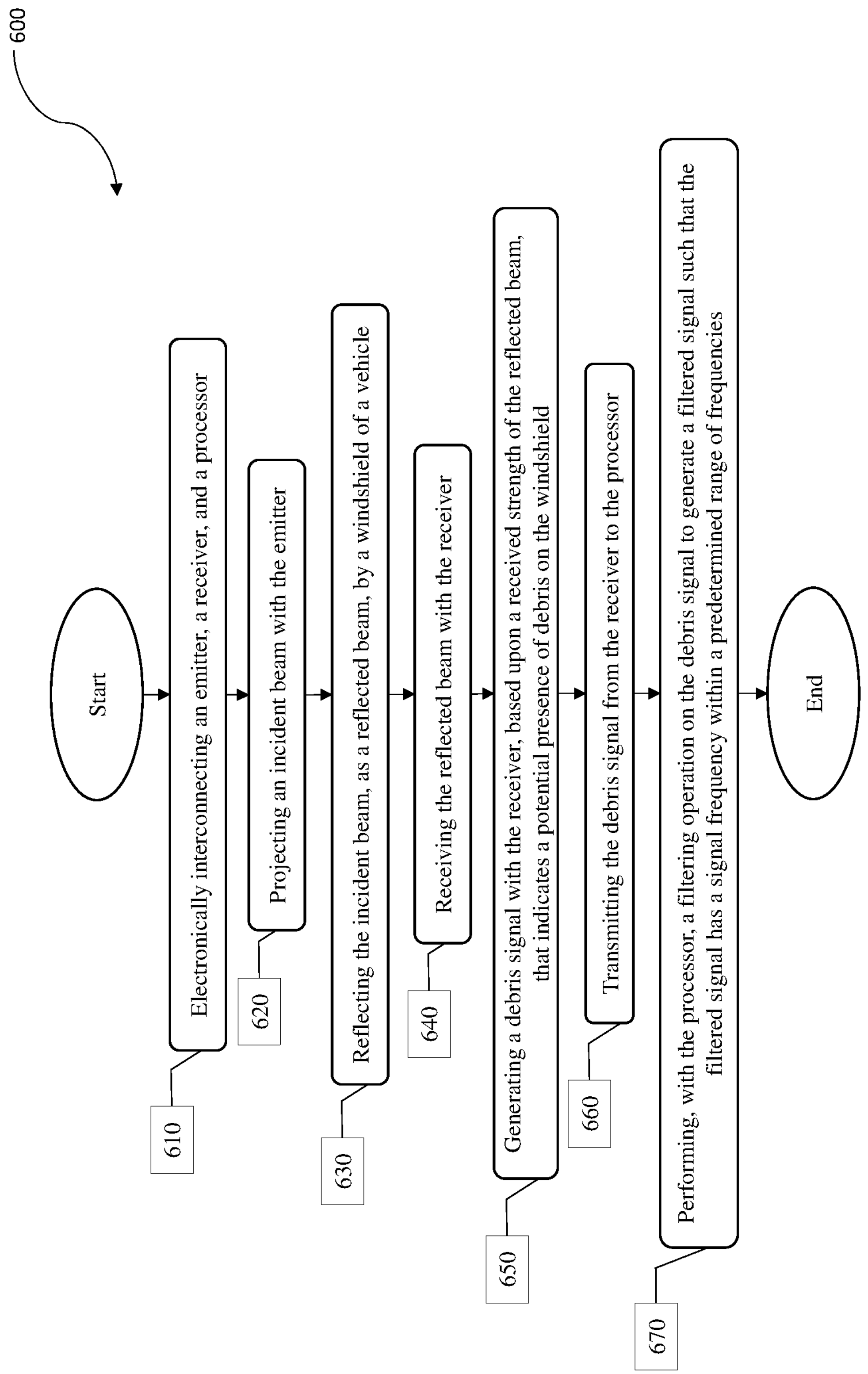
FIG. 6 depicts a flowchart of a method in accordance with one or more embodiments of the present disclosure.

FIG. 6 depicts a flowchart of a method 600 for generating a filtered signal 63 in accordance with one or more embodiments of this disclosure. Steps of the flowchart shown in FIG. 6 may be performed by a rain sensor 21 as described herein, but are not limited thereto. The constituent steps of the method 600 depicted in FIG. 6 may be performed in any logical order, and the method is not limited to the sequence presented. Furthermore, steps of FIG. 6 may be combined and performed in a single step (or single action) without departing from the nature of the specification.

As depicted in FIG. 6, the method 600 initiates with step 610, where an emitter 35, a receiver 37, and a processor 39 are electrically interconnected. The electrical interconnection between the emitter 35, the receiver 37, and the processor 39 is formed by a circuit board 33, which is part of a rain sensor 21. The emitter 35 is embodied, for example, as a laser emission device or similar light emitting device, while the receiver 37 may be embodied as a photocell sensor. On the other hand, the processor 39 is a microprocessor, a dedicated or integrated circuit, a series of one or more processors, or equivalent device that performs one or more signal processing operations.

In step 620, the emitter 35 projects an incident beam 45 to the windshield 19. As noted above, the emitter 35 is embodied as a light emitting device such as a laser emission device. Thus, step 620 includes providing power to the emitter 35, and projecting a laser or other beam of light with the emitter 35 as the incident beam 45. After the emitter 35 has projected the incident beam 45 to the windshield 19, the method proceeds to step 630.

In step 630, the incident beam 45 is reflected, as a reflected beam 47, by the windshield 19. Because the incident beam 45 is intended to be reflected by the windshield 19, the incident beam 45 has a level of energy such that the incident beam 45 is incapable of passing through the windshield 19 and is reflected thereby. For example, the reflection of the incident beam 45 may be facilitated by the geometry of the emitter 35 in relation to the windshield 19, where the incident beam 45 is projected by the emitter 35 such that the incident beam 45 impacts the windshield 19 at an angle that is not normal to the windshield 19 itself. To enable the reflection of the incident beam 45, the windshield 19 may be embodied as a glass surface, and may be coated or uncoated for example. Once the windshield 19 has reflected the incident beam 45 as the reflected beam 47, the method proceeds to step 640.

In step 640, a receiver 37 receives the reflected beam 47. The receiver 37 includes a photocell sensor, for example, that is excited by the reflected beam 47. The level of excitation of the receiver 37 corresponds to the intensity of the reflected beam 47, which, in turn, corresponds to the ability of the windshield 19 to reflect the incident beam 45. During a case where the windshield 19 is covered by rainwater, the reflected beam 47 is only partially reflected (or not reflected at all) by the windshield 19. However, the reflected beam 47 is entirely or mostly reflected by the windshield 19 when rainwater 49 is not disposed thereon. As such, the level of excitation of the receiver 37 varies according to the amount of rainwater 49 on the windshield 19.

In step 650, the receiver 37 generates a rain signal 55 based upon the reflected beam 47 that corresponds to the potential presence for rainwater 49 on the windshield 19. As noted previously, the receiver 37 captures the intensity of the reflected beam 47 by analyzing the excitation of photocell components of the receiver 37. Once the rain signal 55 has been generated by the receiver 37, the method proceeds to step 660.

In step 660, the receiver 37 transmits the rain signal 55 to the processor 39. As noted above, the receiver 37 and the processor 39 are disposed on a circuit board 33, which facilitates the physical interlinking connection therebetween. Thus, step 660 comprises transmitting the rain signal 55 from the receiver 37 to the processor 39 via the circuit board 33. This step may further include the processor 39 requesting access to the rain signal 55 from the receiver 37, or the receiver 37 may periodically transmit the rain signal 55 to the processor 39 at regular intervals. Once the processor 39 has received the rain signal 55, the method proceeds to step 670.

In step 670, in case of Deterministic Signal Processing (DSP), the signals are represented by functions that are time-dependent variables. Thus, the rain signal 55, x(t), is represented by a function that includes a group of signal frequencies within a predetermined range of frequencies and related harmonics with respective magnitudes and phases that are correlated with a definitive presence of the rainwater on the windshield. To this end, the Digital Signal Processing (DSP) unit 57 performs a processing operation on the rain signal 55, represented below as x(t). Step 670 initiates by calculating a Fourier transform of the rain signal 55, x(t), such that $F\{x(t)\}=X(f)$, which is multiplied by a transfer function of the DSP, $F\{h(t)\}=H(f)$, to generate a processed rain signal 61, Y(f), such that $Y(f)=X(f)\ H(f)$, where the processed rain signal 61 represents the rain signal 55 in the frequency domain. Alternatively, a convolution operation (i.e., an operation of the form $y(t)=h(t)*x(t)$) may be performed in the time domain to convolve the rain signal 55 (i.e., x(t)) with a transfer function (i.e., h(t)) representative of the circuit forming the DSP unit 57 and associated components. Once the rain signal 55 is processed to form a processed rain signal 61, the processor 39 applies a filter to remove unwanted frequencies from the processed rain signal 61. The unwanted frequencies of the rain signal 61 to be filtered occupy frequency ranges that correspond to frequencies generated by vibrations (i.e., noise) of the vehicle, and delimit (or are delimited by) a predetermined acceptable range of frequencies. Thus, applying a filter with the processor 39, such as a Butterworth filter, an elliptical filter, a comb filter, a notch filter, a low pass filter, a high pass filter, a band pass filter, or an equivalent filter, is embodied as filtering the processed rain signal 61 with a filter unit 59 to generate a filtered signal 63. The filtered signal 63 may then be transmitted to the ECU 65, which actuates wipers 23 with a wiper motor controller 69 and a wiper motor 27 as described above.

Alternatively, step 670 may include stochastic signal processing rather than deterministic signal processing, where the signals are represented by functions that are time dependent random variables, i.e., random processes. In this case, the rain signal 55, X(t), can be represented by a Wide-Sense Stationary (WSS) random process, X(t) where $\tau=\Delta t=t_2-t_1$, which is a process dependent only on the time difference rather than on particular time $t_1$ or $t_2$, that includes a group of signal frequencies within a predetermined range of frequencies and related harmonics with respective magnitudes and phases that are correlated with a definitive presence of the rainwater on the windshield. In the WSS random process, $S_X(f)$ is a power spectral density of a signal X(t), $R_X(\tau)$ is an autocorrelation function of a signal X(t), $S_{X,Y}(f)$ is a power spectral density of signals X(t) and Y(t), and $R_{X,Y}(\tau)$ is a cross-correlation function of a signals X(t) and Y(t).

To initiate the stochastic signal processing, the Digital Signal Processing (DSP) unit 57 performs a processing operation on the autocorrelation and cross-correlation functions of the rain signal 55, X(t). That is, in the alternative case using stochastic signal processing, Step 670 initiates by calculating a Fourier transform of the autocorrelation and cross-correlation functions, $R_X(\tau)$ and $R_{X,Y}(\tau)$, of the WSS random processes rain signal 55, X(t), and processed rain signal 61, Y(t), such that $F\{R_X(\tau)\}=S_X(f)$, $F\{R_Y(\tau)\}=S_Y(f)$, and $F\{R_{X,Y}(\tau)\}=S_{X,Y}(f)$. The power spectral density $S_{X,Y}(f)$ is multiplied by a transfer function of the DSP, $F\{h(\tau)\}=H(f)$, to generate a Fourier transform of a processed autocorrelation and to generate cross-correlation functions of a processed rain signal 61, $S_Y(f)$ and $S_{X,Y}(f)$ respectively, such that $S_Y(f)=H(f)*H(f)\ S_X(f)$ or $S_Y(f)=|H(f)|^2\ S_X(f)$ and $S_{X,Y}(f)=H(f)*S_X(f)=H(f)S_Y(f)$ (where $S_{X,Y}(f)=S_{Y,X}(f)*$, and $H(f)*$and $S_{Y,X}(f)*$ are complex conjugates of H(f) and $S_{X,Y}(f)$, respectively) where the processed rain signal 61 represents a rain signal 55 in the frequency domain.

Alternatively, convolution operations (i.e., operations of the form $R_Y(\tau)=h(-\tau)*h(\tau)*R_X(\tau)$ and $R_{X,Y}(t)=h(-\tau)*R_X(\tau)=h(\tau)*R_Y(\tau)$ where $R_{X,Y}(\tau)=R_{Y,X}(-\tau)$ and $F\{h(-\tau)\}=H(f)*$) may be performed in the time domain to convolve the autocorrelation and cross-correlation functions, $R_X(\tau)$ and $R_{X,Y}(\tau)$, of the rain signal 55, X(t), and a transfer function, $h(\tau)$, representative of the circuit forming the DSP unit 57 and associated components. In this case, $h(\tau)$ is not a random process; hence the lower case "h" notation is used in the time domain. The rain signal, X(t), with the predetermined range of frequencies, relevant harmonics, and their respective magnitudes and phases, can be processed by various operations with the use of DSP. This may include, for example, mathematical operations of various statistical models of random processes, such as Gaussian Probability Density Function (PDF) or Cumulative Distribution Function (CDF), Uniform PDF/CDF, Gamma PDF/CDF, Exponential PDF/CDF, and other relevant PDFs/CDFs. Regardless of whether deterministic or stochastic signal processing is employed, other mathematical models can be considered for processing the rain signal 55 to achieve the processed rain signal 61 by designing algorithms with the use of programming languages, such as C, C++, C#, Fortran, Pascal, MATLAB, and other development methods, for example.

Accordingly, embodiments of the invention are directed towards devices, systems, and methods used to remove noise from a signal indicating the potential presence of rainwater on a windshield. In particular, by filtering the portions of a rain signal that typically correspond to a lack of rainwater and a presence of noise, embodiments of the invention are capable of controlling one or more wipers according to a filtered signal correlated to the definitive presence of rainwater on the windshield. In turn, this increases the comfort and visibility of the user, as the operation of the vehicle is not interrupted by an errant actuation of the wipers. Furthermore, embodiments of the invention conserve energy stored in the vehicle by avoiding having to expend energy on the errant actuations.

Although only a few example embodiments have been described in detail above, those skilled in the art will readily appreciate that many modifications are possible in the example embodiments without materially departing from this invention. For example, although the disclosure describes the rain sensor as being fixed to an upper region of a windshield, the rain sensor may be placed at any suitable position to detect the presence of rainwater on the vehicle. Furthermore, although the predetermined range of frequencies is described as being input by a vehicle manufacturer, the predetermined range of frequencies may instead be derived as part of a machine learning process, or be transmitted by a server to the vehicle. Embodiments of the invention may further be adapted according to the presence of a coating on a windshield (such as a window tint) to prevent errant wiper motions resulting from the windshield coating. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A rain sensor comprising:

an emitter configured to project an incident beam that is reflected, as a reflected beam, by a windshield of a vehicle comprising the rain sensor;

a receiver configured to generate, based upon a received intensity of the reflected beam, a rain signal indicating a potential presence of rainwater on the windshield;

a processor configured to:

receive the rain signal, and perform a filtering operation on the rain signal to generate a filtered signal; and a printed circuit board (PCB) configured to electronically interconnect the emitter, the receiver, and the processor, wherein the filtering operation comprises filtering noise from the rain signal such that the filtered signal has signal frequencies and related harmonics of the signal frequencies within a predetermined range of frequencies and with respective magnitudes and phases that are correlated with a definitive presence of the rainwater on the windshield, and wherein the processor is further configured to calculate a Fourier transform of the received rain signal.

2. The rain sensor of claim 1, further comprising: an adhesive pad configured to rigidly fix a casing of the rain sensor to the windshield of the vehicle.

3. The rain sensor of claim 2, wherein the noise originates from at least one of: vibrations of the vehicle, vibrations of components of the vehicle, temperature variations, and changes in a geometry of the adhesive pad.

4. The rain sensor of claim 1, wherein the filtering operation is performed using one or more of: a Butterworth filter, an elliptic filter, a comb filter, a notch filter, a low pass filter, a high pass filter, a band pass filter, or an equivalent filter or filtering process.

5. The rain sensor of claim 1, further comprising a memory configured to receive and store the rain signal, a filter used in the filtering operation, the predetermined range of frequencies, the related harmonics and their respective magnitudes and phases, the filtered signal, and outputs of the filtering operation.

6. The rain sensor of claim 1, wherein the predetermined range of frequencies is determined such that the predetermined range excludes the frequencies, the related harmonics, and their respective magnitudes and phases that are associated with a presence of the noise.

7. An assembly comprising:

a vehicle comprising a cabin that forms an interior of the vehicle;

a windshield configured to provide a barrier between an external environment of the vehicle and the cabin of the vehicle;

a rain sensor, comprising:

an emitter configured to project an incident beam that is reflected, as a reflected beam, by the windshield of the vehicle;

a receiver configured to generate, based upon a received intensity of the reflected beam, a rain signal indicating a potential presence of rainwater on the windshield;

a processor configured to:

receive the rain signal, and perform a filtering operation on the rain signal to generate a filtered signal, and a printed circuit board (PCB) configured to interconnect the emitter, the receiver, and the processor, wherein the filtering operation comprises filtering noise from the rain signal such that the filtered signal has signal frequencies and related harmonics of the signal frequencies within a predetermined range of frequencies and with respective magnitudes and phases that are correlated with a definitive presence of the rainwater on the windshield;

an Electronic Control Unit (ECU) configured to receive the filtered signal from the rain sensor, process the filtered signal, and transmit an operating command that includes a duration and a number of occurrences of a period of time to operate a windshield wiper; and a wiper motor controller configured to receive the operating command from the ECU, and actuate a wiper motor according to the operating command, wherein the wiper motor is fixed to the windshield wiper of the vehicle such that the windshield wiper actuates according to the operating command received by the wiper motor controller, and wherein the processor is further configured to calculate a Fourier transform of the received rain signal.

8. The assembly of claim 7, further comprising: an adhesive pad configured to rigidly fix a casing of the rain sensor to the windshield of the vehicle.

9. The assembly of claim 8, wherein the noise originates from at least one of: vibrations of the vehicle, vibrations of components of the vehicle, temperature variations, and changes in a geometry of the adhesive pad.

10. The assembly of claim 7, wherein the filtering operation is performed using one or more of: a Butterworth filter, an elliptic filter, a comb filter, a notch filter, a low pass filter, a high pass filter, a band pass filter, or an equivalent filter or filtering process.

11. The assembly of claim 7, further comprising a memory configured to receive and store the rain signal, a filter used in the filtering operation, the predetermined range of frequencies, the related harmonics and their respective magnitudes and phases, the filtered signal, and outputs of the filtering operation.

12. A method comprising:

electronically interconnecting an emitter, a receiver, and a processor of a rain sensor;

projecting an incident beam with the emitter;

reflecting the incident beam, as a reflected beam, by a windshield of a vehicle;

receiving the reflected beam with the receiver, generating a rain signal with the receiver, based upon a received intensity of the reflected beam, that indicates a potential presence of rainwater on the windshield;

transmitting the rain signal from the receiver to the processor, and performing, with the processor, a filtering operation on the rain signal to generate a filtered signal such that the filtered signal has signal frequencies and related harmonics of the signal frequencies within a predetermined range of frequencies and with respective magnitudes and phases that are correlated with a definitive presence of the rainwater on the windshield, and calculating, with the processor, a Fourier transform of the received rain signal.

13. The method of claim 12, further comprising: processing the filtered signal with an Electronic Control Unit (ECU) to generate an operating command that includes a duration and a number of occurrences of periods of time to operate a windshield wiper.

14. The method of claim 13, further comprising: controlling a wiper motor such that the windshield wiper fixed to the wiper motor actuates according to the operating command.

15. The method of claim 12, further comprising: generating noise with one or more of: vibrations of the vehicle, vibrations of components of the vehicle, temperature variations, and changes in a geometry of an adhesive pad configured to rigidly fix a casing of the rain sensor to the windshield of the vehicle.

16. The method of claim 12, wherein performing the filtering operation comprises filtering the rain signal with one or more of a Butterworth filter, an elliptic filter, a comb filter, a notch filter, a low pass filter, a high pass filter, a band pass filter, or an equivalent filter or filtering process.

17. The method of claim 12, wherein the predetermined range of frequencies is determined such that the predetermined range excludes the frequencies, the related harmonics, and their respective magnitudes and phases that are associated with a presence of noise.

* * * * *